United States Patent [19]

Soref et al.

[11] Patent Number: 4,516,837

[45] Date of Patent: May 14, 1985

[54] ELECTRO-OPTICAL SWITCH FOR UNPOLARIZED OPTICAL SIGNALS

[75] Inventors: Richard A. Soref, Newton Centre; Donald H. McMahon, Carlisle, both of Mass.

[73] Assignee: Sperry Corporation, New York, N.Y.

[21] Appl. No.: 468,526

[22] Filed: Feb. 22, 1983

[51] Int. Cl.³ .............................................. G02F 1/13
[52] U.S. Cl. ............................... 350/347 V; 350/400; 350/402; 350/403; 350/96.15; 350/96.20
[58] Field of Search ........... 350/347 R, 347 V, 347 E, 350/400, 402, 403, 96.15, 96.20

[56] References Cited

U.S. PATENT DOCUMENTS

| | | | |
|---|---|---|---|
| 1,963,127 | 6/1934 | Gardner | 350/402 |
| 4,278,327 | 7/1981 | McMahon et al. | 350/347 R X |
| 4,385,799 | 5/1983 | Soref | 350/347 V X |
| 4,461,543 | 7/1984 | McMahon | 350/403 X |

Primary Examiner—John K. Corbin
Assistant Examiner—Richard Gallivan
Attorney, Agent, or Firm—Howard P. Terry; Arnold L. Albin

[57] ABSTRACT

An optical 1×N switch uses a polarizing beam splitter cube and a reflector to separate an arbitrarily polarized incident light beam into polarized components which propagate along parallel paths. A polarization rotator is positioned in the path of the reflected component to rotate the plane of polarization of the light beam component propagating therealong to be coplanar with that of the undeviated light beam in the parallel path. The two beams are simultaneously or individually deflected by selectively activating the electrodes of a liquid crystal nematic reflector/transmitter array confined between prismatic bodies to emerge at one or more of a plurality of desired outputs. In a second embodiment, a second polarization rotator and polarizing beam combiner assembly re-establishes the initial polarization and the beams are thereby combined to emerge from one or more selected output terminals as an arbitrarily polarized light beam. The switch exhibits extremely low crosstalk and insertion loss by utilizing the energy of both parallel and normal incidence polarization components and avoiding propagation of undesired stray polarization components as occurs with a liquid crystal polarizer.

20 Claims, 15 Drawing Figures

ELECTRO-OPTICAL SWITCH FOR UNPOLARIZED OPTICAL SIGNALS

BACKGROUND OF THE INVENTION

1. Field of the Invention

The invention pertains to electrically-controlled devices for switching optical signals and more particularly to electrically-controlled devices employing optically active nematic liquid crystals for switching polarized or unpolarized optical signals with low insertion loss.

2. Description of the Prior Art

Fiber optic transmission systems have found favor, particularly for linking distributed computers and computer-controlled industrial system components, because of their high information transmission capacity, immunity from electro-magnetic interference, and security from unauthorized interception. Such optical transmission systems may utilize switching devices for control purposes or for transferring data from one link to another. One favored approach utilizes a single-fiber, multi-mode optical transmission line. In such a line, the light output is characteristically unpolarized. Nematic liquid crystal electro-optic elements of prior art optical switches providing high crosstalk rejection ratios have been shown to be capable of switching only one component representing a single polarization of the incident light, with any given liquid crystal composition. (Unpolarized light may be represented by a vector sum of two orthogonally polarized light beam components). In consequence, the non-favored orthogonal polarization component has been heretofore discarded, resulting in relatively high insertion loss of the order of one-half the available optical power in the prior art switches.

A representative switch of the prior art employing liquid crystal elements is shown in U.S. Pat. No. 4,278,327, issued July 14, 1981 to Donald H. McMahon and Richard A. Soref and assigned to the Assignee of the present invention. That disclosure has an extensive discussion of prior art deficiencies and points out in particular that electro-optic devices as described therein are seriously polarization sensitive. A typical prior art optical switch as in FIG. 3 therein is shown to switch not more than 50% of the power of an input unpolarized light beam, which switch, by virtue of its inherent inability to handle orthogonal light polarizations, introduces a 3 db loss as well as input and output coupling losses between the terminals of a link. Such a loss could become particularly serious when additional such devices are used in series interconnections. McMahon and Soref show that by appropriately manipulating the polarization states of the light beam components entering the device, a polarization-independent liquid crystal switch may be devised. These prior art devices, however, utilize the polarizing properties of the liquid crystal media to separate incoming unpolarized light into orthogonal linearly polarized components. Because a liquid crystal polarizer does not reflect and transmit equal percentages of light for the components parallel to and normal to the plane of incidence and permits some random polarization to occur, it is somewhat less than an ideal polarizing device. In consequence, undesired light beam components propagated within the switch result in cross-talk, limiting the isolation to a factor of the order of 12 db, which represents approximately a 16:1 power ratio between the desired and undesired signals. This level of isolation is insufficient for many critical applications. A further disadvantage of the prior art, as shown in FIG. 12 of McMahon and Soref, is the relative complexity of the structure required for switching between a multiplicity of output terminals, it being noted that successive layers of crystal prisms and liquid crystal materials are required for all but the most elementary switch.

A second prior art device is disclosed by McMahon in U.S. patent application Ser. No. 362,563, U.S. Pat. No. 4,461,543, Electro-Optic Switch, also assigned to the Assignee of the present invention. That invention provides a combination of birefringent crystal prism and liquid crystals operating in the nematic twist mode to polarize, switch, and recombine the polarized components into a single light beam of arbitrary polarization. While providing improved performance in the way of low insertion loss and improved optical isolation between input and output terminals, it again requires a relatively complex structure which is not amendable to miniaturization and relatively low cost construction. In the 1×N embodiment shown therein a plurality of nematic liquid crystal-birefringent device combinations arranged in tandem are required, the number of output terminals being doubled for each liquid crystal-birefringent crystal combination addition.

It is, therefore, an object of the present invention to provide an optical switch for routing light from a single multi-mode optical fiber input to one or more multi-mode fibers outputs in response to electrical command signals, and to provide a reciprocal optical switch which may accommodate multiple inputs and combine them to provide a single output, while minimizing crosstalk, optical insertion losses, size, and construction complexity and cost.

SUMMARY OF THE INVENTION

The invention comprises novel electro-optical apparatus for switching optical data between single input and plural output fiber optic light guides of the single strand, multi-mode type by selective electric field excitation of nematic liquid crystal materials. The technique employs an assembly of polarizing beam splitter and reflecting prisms half-wave-plate retarders, superposed glass prisms and a liquid crystal layer therebetween. Switching of unpolarized light is readily achieved with low insertion loss, loss cross-talk, and low control voltages. Versatile in nature so that many different switching configurations may be employed, the embodiments of the invention avoid the problems of the prior art by using means independent of the liquid crystal medium for polarizing and recombining polarized light beams. Some embodiments of the invention are further advantageous because the invention permits selection between a 1-polarization structure or 2-polarization structure.

An optical switch constructed according to the principles of the present invention includes an input polarizing beam splitter device wherein the p-state and s-state polarizations of unpolarized light relative and incident thereto are separated therein to emerge therefrom along divergent paths. A reflecting prism is positioned in the path of the s-state orthogonal component, as referred to the incident light beam, to redirect the s-state light beam component to a path parallel to the incident light beam. The p-state polarized component is transmitted and propagated without change through the polarizing beam splitter device. The reflected polarized s-state component of the incident light beam impinges upon a half-wave retardation plate properly oriented with respect to the polarization vector to provide a polarization rotation of 90°, thereby establishing substantially equal polarizations for the light beams traversing the two paths. The two beams are then incident upon a liquid crystal path selector switch, wherein the components are guided along parallel paths electrically selected by energization of interposed nematic liquid crystal devices in accordance with the input-output terminal coupling desired, and emerge therefrom along two substantially parallel paths with substantially the same polarizations as that of the light beams incident thereto. In one embodiment of the invention, the path selector supplies means for independently selecting and directing each beam to one of a corresponding multiplicity of output terminals. In a second embodiment, a second half-wave retardation plate is located in one emerging path to rotate the polarization of the light beam propagation therealong through 90°, thus re-establishing the p-state, s-state polarization relationship of the light beams traversing the two parallel paths. The two orthogonally polarized wave components are then incident upon an output polarizing beam combiner device, having an optic axis substantially parallel to the optic axis of the input light beam components, and emerge therefrom as an arbitrarily polarized beam along a common path directed to a selected output terminal. By virtue of these embodiments, a 1×2N switch device with approximately 3 db polarization loss, or 1×N switch device with approximately 0 db polarization loss may be provided within the same volume, which may be as small as 5 cm×2 cm×2 cm for N=4.

In a third embodiment, an additional prismatic reflecting path is provided in the path selection switch. The number of switching positions is increased without significant increase in physical length of the switch by an optical folding technique capable of providing a compact, low-volume switch of 1×2N for one polarization with 3 db polarization loss, or 1×N for two polarizations with 0 db polarization loss.

While the embodiments heretofore described have featured an optical switch with the half-wave retardation plate disposed between the output face of a right angle reflecting prism and the liquid crystal prism, the retardation plate may also be conveniently disposed between the superposed faces of the polarizing beam splitter cube and the reflecting prism.

Other features of the invention will become apparent from the following description and from the accompanying drawings which illustrate preferred embodiments thereof, without limiting the scope of the invention.

DESCRIPTION OF THE PREFERRED EMBODIMENTS

The invention makes use of a polarizing beam splitter cube, coupled to a reflecting prism and a half-wave retardation plate with 90° rotary properties, which act to polarize an incoming light beam of arbitrary polarization into two parallel beams of like polarity. The polarized beams are directed to a liquid crystal switch where they can individually or both be transmitted or reflected to one or more of a multiplicity of output terminals. By the use of a reciprocal structure on the output terminal side, the parallel polarized beams can be recombined into a single switched beam with minimal loss and crosstalk. A liquid crystal operating in the uniform parallel homogeneous oriented mode will provide total reflection of an incoming ray of arbitrary polarization, when in the unexcited state, when the optical angle of incidence is greater than the critical angle $\theta_c$ which is a function of the refractive indices of the media. With full excitation placed upon the electrodes, the parallel or p-polarized component of the light beam is transmitted through the nematic layer while the s-component continues to be reflected. These properties may be beneficially utilized in the optical switch of the present invention, where the incoming beam components are ordered in like polarization.

Figure 1:
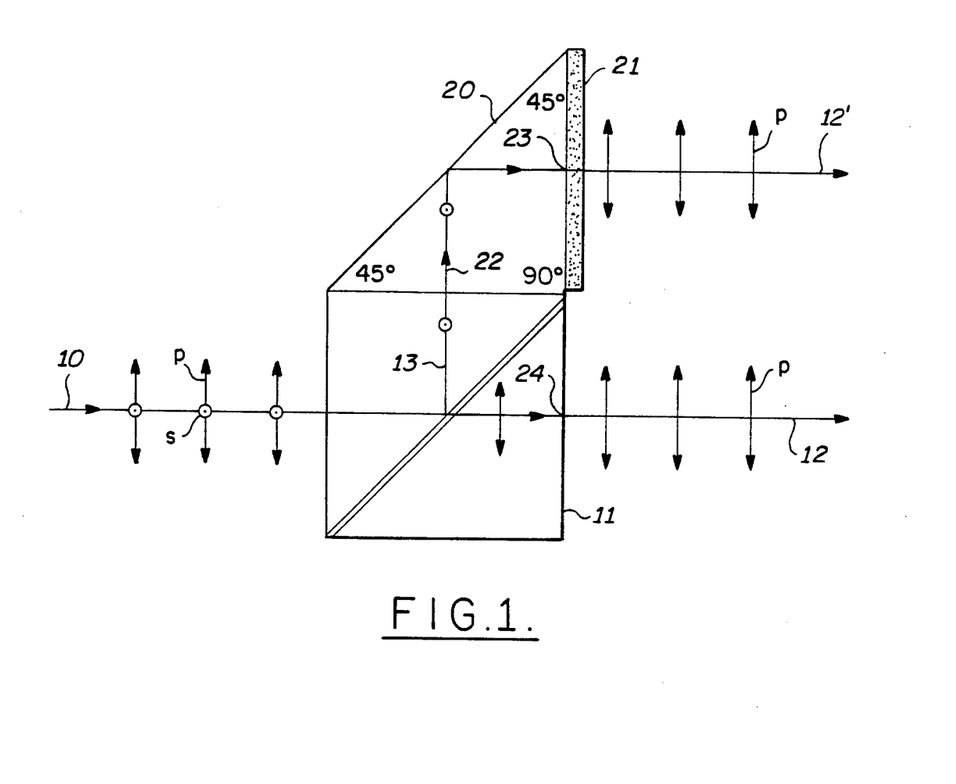
FIG. 1 is a plan view of the combination of a polarizing beam splitter with a reflecting prism and a half-wave retardation plate, showing the resolution of the input beam into polarized components.

FIG. 1 shows an incident ray 10 entering a polarizing beam splitter cube (PBS) 11 at normal incidence. The arbitrarily polarized incident ray 10 may be represented by orthogonally-polarized components p and s where p is the component linearly polarized in the plane of incidence. The transmitted ray 12 is seen to consist substantially of the p-component. The reflected polarized ray component 13 is seen to consist of the s-component.

FIG. 1 also shows the PBS cube 11 with the addition of a reflecting prism 20 and a half-wave retardation plate 21. It is merely a matter of design choice as to locating the retarder on the output face 23 of the reflecting prism 20, or locating the retarder between the superposed faces of the polarizing beam splitter cube 11 and the reflecting prism 20. Similarly, such a choice is available when the PBS is employed as a beam combiner in a reciprocal fashion, as will be described later herein. Since the retarder as used herein is chromatic the phase change is dependent upon wave length; therefore the thickness must be chosen to be compatible with the wave length of the incident light. Similarly, the PBS cube must be selected to be compatible with the incident light wave length. In consequence, the optical switch possess chromatic properties and will be most efficient with an incoming light beam of narrow bandwidth. The reflected s-polarized component 13 exiting PBS cube 11 enters glass prism 20 at face 22. By applying the incident ray 13 at normal incidence to the 45°, 45°, 90° prism shown, it is totally internally reflected therein to emerge at face 23 as an s-beam polarized component parallel to the transmitted p-beam component. Other prisms or reflectors capable of providing total reflection over a 90° path may also be used. The reflected s-polarized ray component 13 in passing through half-wave plate 21 is thereupon transformed into a p-polarized ray component 12. It may be seen therefore, that both orthogonal components have been preserved in the polarization process and emerge as like polarized rays. The polarizing beam splitter cube 11 is comprised of two right angle prisms with their common hypotenuse coated with multilayered dielectric and cemented with high quality optical cement. When matched to the wave length of the input light beam, the PBS cube is capable of providing a transmission efficiency ("p" component) of 98% and a reflection efficiency ("s" component) of 99.8%. Suitable PBS cubes of this type may be obtained from CVI Laser Corporation as their Series PBS 5. Such a cube is available as small as 3 mm on a side.

The half-wave retardation plate 21 is a polarization form converter with close to 100% efficiency. It is an optical element with two principle axes, slow and fast, that resolves an incident beam into two orthogonally polarized components (the component parallel to the slow axis lags the one parallel to the fast axis), without appreciably altering the intensity or degree of polarization. It then recombines the two components to form a single emerging beam of a specific polarization form. The extent to which one component is retarded relative to the other is called the retardance or retardation. A half-wave retarder will effectively rotate the plane of polarization of a properly oriented incident beam by 90°. Suitable retarder plates are available from the Polaroid Corporation of Cambridge, Mass.

Figure 2:
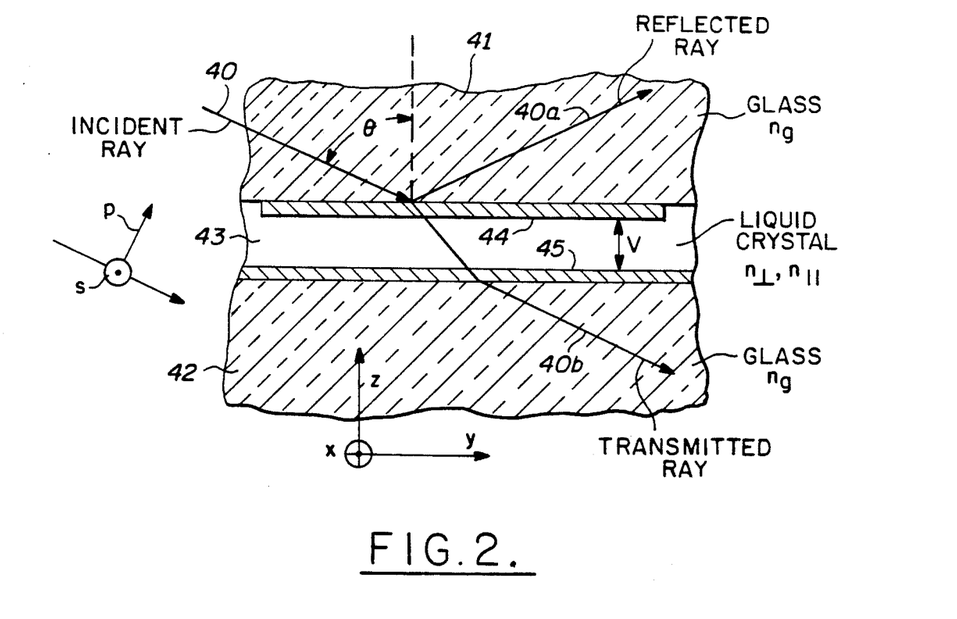
FIG. 2 is a fragmentary cross-sectional view in elevation of the liquid crystal useful in explaining the operation of the invention, which is an expanded view taken from FIG. 5.
Figure 5:
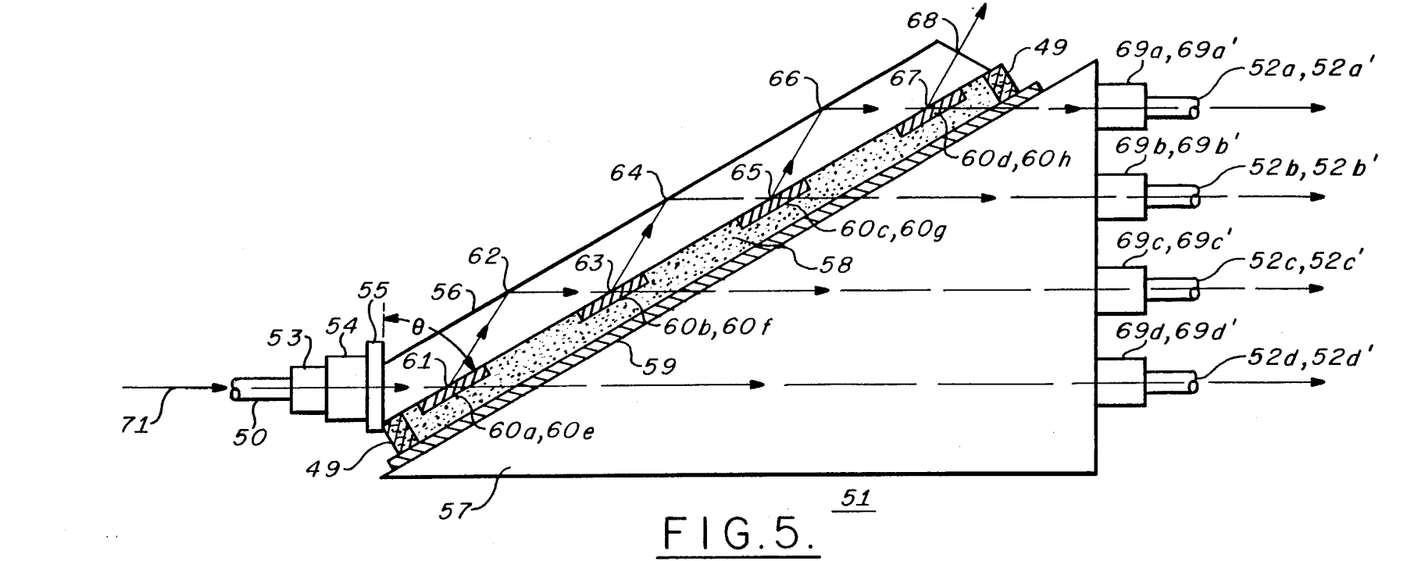
FIG. 5 is an elevation view of a single-polarization optical switch of the present invention.

Referring now to FIG. 2, there is shown a fragmentary cross-sectional view of a liquid crystal switch of the present invention, which is an expanded view of a portion of FIG. 5 for clarity. Switching is accomplished by beneficially employing the variable refractive index properties of thin planar films of aligned liquid crystals in nematic media when disposed between cooperating pairs of transparent bodies made of glass with a high index of refraction. The optical refractive index $n_g$ of the glass bodies 41 and 42 is selected to be greater than the ordinary refractive index $N_o$ of the thin liquid crystal film 43. The value of $n_g$ may be equal to or slightly less than the extraordinary index $n_e$ of the liquid crystal medium of film 43. The opposed flat, polished surfaces of prismatic bodies 41 and 42 at the interfaces with the liquid crystal film 43 are supplied with respective opposed thin optically transparent, electrically-conducting layers 44, 45, preferably of indium-tin oxide of the order of thickness 300-500 Angstroms. Microgroves, not shown, may be formed in the conventional way by oblique deposition of 100-200 Angstroms of SiO or MgF$_2$ on the electrodes 44, 45 so as to enhance uniform homogeneous parallel ordering of the long liquid crystal molecules, especially for positive anisotropic liquid crystal materials, in a preferred direction in the absence of the electric field V. Alternatively, the electrode surface may be buffed in a preferred direction to achieve similar homogeneous ordering. When a control electric field V is applied between conductive electrodes 44, 45 the effect of the presence of the field in the liquid crystal medium is to re-order the long axes of most of the liquid crystals, except for a negligibly small portion of the molecules at the surfaces of the electrodes. The reorientation of the molecules causes the liquid crystal film to present a new refractive index $n_e$ to the light of a typical light ray or beam 40.

The incoming light beam 40, incident at an oblique angle $\theta$ (where $\theta \approx \theta_c + 5°$) at electrode 44 and where $\theta$ is measured with respect to the normal $\theta_2$, is reflected as light beam 40a or caused by the control signal V to traverse liquid crystal film 43 and be transmitted as light beam 40b. The critical angle $\theta_c$ for total internal reflection of incident light beam 40 is governed by the ratio of the refractice index of the liquid crystal media to refractive index of the prism 41 and depends both upon the applied field V and the optical polarization. If the optical incidence angle $\theta$ is greater than $\theta_c$ (at V=0) the incident beam is reflected as beam 40a; if not, the incident beam is propagated through liquid crystal film 43, exiting via glass prism 42 as beam 40b. Since FIG. 2 has been exaggerated for clarity, as the thicknesses of films 43, 44, and 45 are each very small, the layer of liquid crystal being typically 6 μm thick, the actual deviation of the exit beam 40b is also very small. By properly ordering the long axes of the liquid crystal molecules, which in the preferred embodiment are made parallel to the liquid crystal interface and parallel to the optical plane of incidence of beam 40 and its normal, an unpolarized beam may be totally reflected at V=0. Further, when V is applied at a level sufficient to orient the major portion of the molecules with their long axes parallel to the applied electric fields, the s-polarized beam component will be reflected and the orthogonal p-polarized beam component will be transmitted. Note that while both polarization components can be reflected by the liquid crystal layer, only one polarization component may be transmitted or switched. As a result, prior art switches which relied on transmission and polarization through the liquid crystal layer required that the incoming light beam be polarized so that the undesired component could be discarded before switching, thereby avoiding excess cross-talk. Clearly, this resulted in a loss of optical power of 3 db. In the present invention, the s-component is transformed to a p-component before entering the liquid crystal, thereby conserving the power lost in the prior art.

Although the present invention is illustrated by the use of positive dielectric anisotropic media, similar concepts could be applied with negative dielectric anisotropic media by appropriate treatment of the electrode surfaces.

Figure 3:
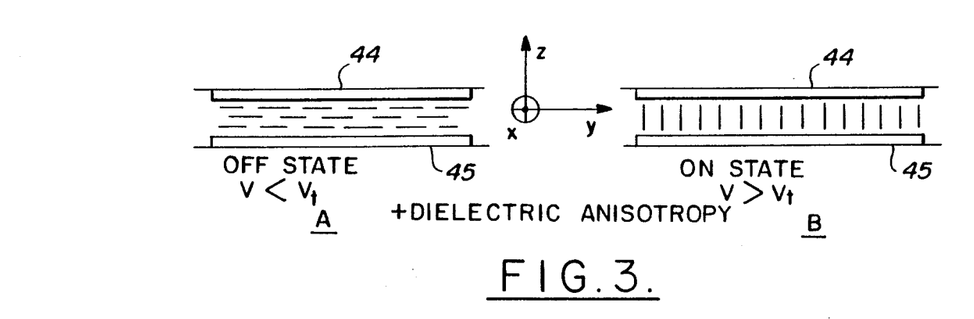
FIG. 3 is a simplified cross-sectional view in elevation also useful in explaining the operation of a liquid crystal showing two molecular states of activation as found in FIG. 2.

Referring now to FIG. 3 several types of orientation of the long axes of nematic crystals are shown to be useful in the invention. FIGS. 3a and 3b illustrate the off and on states respectively for a positive dielectric anisotropic liquid crystal material whose unexcited order is with the long axes of its molecules both parallel to the substrate interface and parallel to the optical incidence plane. In this condition both polarizations are totally reflected with no applied voltage. Beneficially, the leakage transmission or optical cross-talk is extremely low in this condition. With sufficient excitation placed between the transparent electrodes 44, 45, the long molecular axes become oriented perpendicular to the electrodes and only a p-ray light component is transmitted through the nematic layer, while an s-ray component continues to be reflected. Thus it is seen that the liquid crystal layer may be used as a polarizing device for unpolarized light, or as a switching device where light of a predetermined polarity is applied thereto. For a glass prism structure as shown herein, the incident light beam is typically applied at an oblique angle $\theta$ of about 66° to the planar liquid crystal film. The face angles of the prism are also selected to be about 66°. The light rays therefore will enter and exit the prisms perpendicular to its respective faces, thereby minimizing reflection losses and off-axis rays. The film may be an a nematic mixture such as E 9 from BDH Chemicals Corporation, located in Dorset, England. The prisms are preferably made of flint glass, as optical glass type SF14, supplied by Schott Glass Company, Duryea, Pa., chosen so that the refractive index of the glass matches the extraordinary index of the liquid crystal media. At a wave length of 589 nm, preferable values are $n_g = 1.762$, $n_e = 1.775$, and $n_o = 1.52$, wherein $n_g$ = the refractive index of glass, $n_e$ = the extraordinary index of the liquid crystal medium, and $n_o$ = the ordinary index of the liquid crystal. The ordinary index of the liquid crystal is obtained without excitation, while the extraordinary index is obtained with the desired voltage V applied. It will be appreciated by one skilled in the art that similar relationships of $n_g$, $n_o$, and $n_e$ at the favorable optical communications wave lengths of 0.85 $\mu$m and 1.3 $\mu$m.

Figure 4:
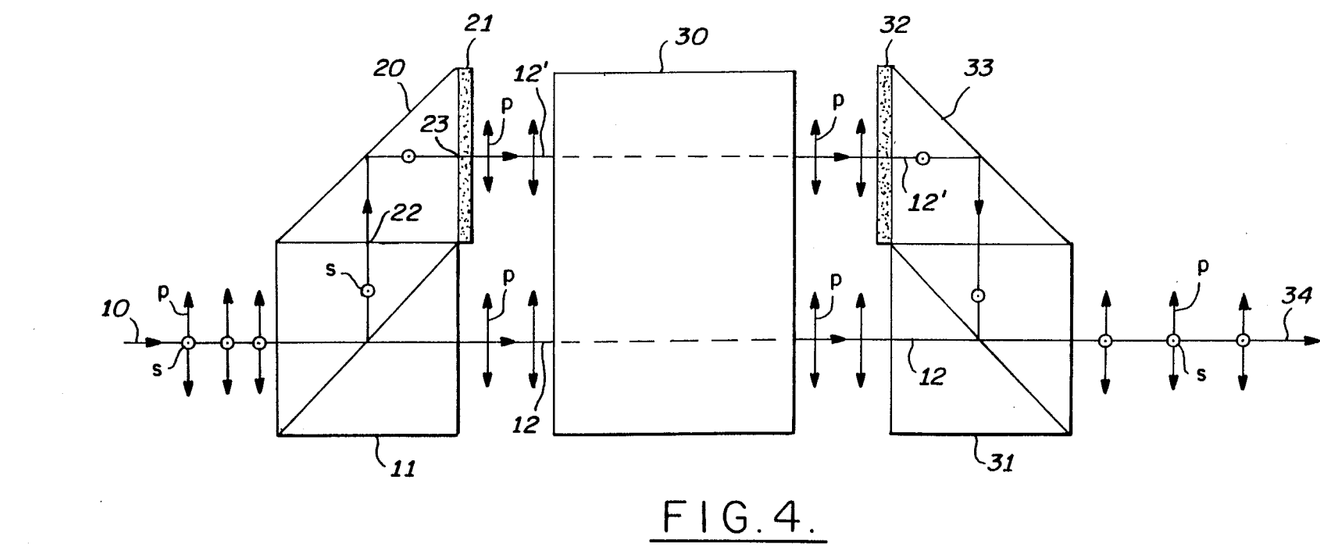
FIG. 4 shows in plan view the polarizing beam splitter assembly of FIG. 1 in combination with a liquid crystal switch of the present invention, also incorporating a polarizing beam combiner for forming an output beam of arbitrary polarization.

Referring now to FIG. 4, which schematically indicates the light beam paths, ray components 12 and 12' are seen to exit polarizing beam splitter cube 11 and retarder 21, respectively. If these two beams, now polarized in the p-state, impinge on a liquid crystal switch 30, then both can be totally reflected or propagated therethrough. Moreover, by adding an additional retarder-reflector-PBS assembly 31, 32, 33 at the output of the liquid crystal switch 30, the two p-polarized state beams can be recombined to emerge as a single beam 34 of arbitrary polarization. Since, except for small transmission losses, all of the incident light beam energy is switched, rather than only 50% as in the prior art, there is obtained a significant 3 db improvement in the optical insertion loss over the prior art switches.

FIG. 5 shows a 1×8 type switch for selectively presenting an unpolarized light input 71 on multi-mode fiber 50 to path selection switch 51 and therefrom emerging at one or more of selected output fibers 52a through 52d and parallel output fibers 52a' through 52d' in an 8-output array. Associated with multimode fiber 50 for collimating the incident unpolarized light beams upon polarizing beam splitter 54 to within ±1° is a quarter-pitch graded index cylindrical lens 53, such as SELFOC SLS, 2 mm in diameter, as manufactured by Nippon Sheet Glass Company, Ltd. and distributed by NSG America, Inc., Clark, N.J.

At the normal-incidence output surface of the lower prism 57, eight identical one-quarter pitch SELFOC lenses 69a-d and 69a'-d' are provided, one for each optical fiber, to focus the switched light on the associated fibers, all disposed in perpendicular relationship with respect to their associated face. Collimating and focusing lenses have a beneficial effect in providing lower cross-talk in the switching array. The selected lens preferably has three features for use in the present invention: the lens length is one-fourth of the pitch so as to image the fiber core source at infinity, the lens numerical aperture is greater than the core numerical aperture, and the lens outside diameter must exceed the fiber cladding diameter. Similar properties are useful in focussing the collimated beam on the exit fibers.

The miniature PBS 54 and half-wave plate 55 have been heretofore described with respect to FIG. 4, elements 11 and 21 respectively. The right angle prism 70 used as a reflecting device is a conventional component. All components are placed in contact with one another and secured with thin films of anti-reflection refractive index-matching optical cement.

The smaller upper prism 56 includes the lens 53 whose optical axes is fixed in perpendicular relationship to an upwardly slanted input face of the prism 56, which face is cut at an angle $\theta$ approximately 66° with respect to the elongated base surface. Lower prism 57 in this embodiment is triangular in form, but other geometries may be used. The prisms 56 and 57 are preferably separated by continuous rectangular gasket 49 for confining a suitable positive anisotropic liquid crystal medium. The individual segmented optically transparent electrodes 60a–60h are continuous with the base surface of prism 56 while the upper oblique face of prism 57 has one optically transparent electrode 59 respectively disposed in opposition to electrodes 60. Each electrode 59 and 60 is supplied with conventional conductive leads for electrical excitation, not shown. Light beam signals on multimode fiber input 50 may be selectively directed to one or more outputs 52a-52d' depending upon the selected actuation of the eight electro-optic electrodes.

Figure 6:
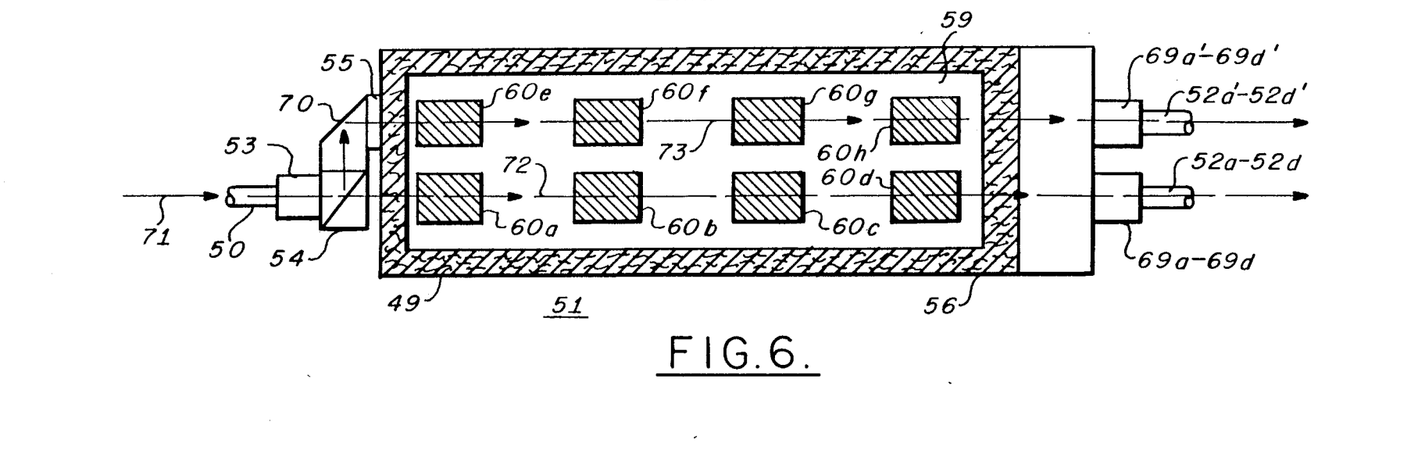
FIG. 6 is a plan view of the invention of FIG. 5, showing disposal of the liquid crystal electrodes.

The electrodes are preferably disposed in two parallel rows spaced 5 mm apart, corresponding to the PBS dimensions. In FIG. 6 eight such independent transparent electrodes 60a–60h are shown applied to prism 56 which may be photo-etched rectangules of indium-tin-oxide film 2 mm by 5 mm, applied by sputter deposition, or may be applied by evaporation through a mask. A single common electrode 59 is deposited on the oblique surface of opposing prism 57, comprising a uniform sheet of indium-tin-oxide, facing the independent electrodes 60. A single, uniform liquid crystal film 58 is confined between the electrode layers and retained by gasket 49.

It may be seen that the structure is simple, compact (approximately 5 cm×2 cm×2 cm in volume), and the optical paths are short, permitting low loss fiber optic coupling. This embodiment provides four parallel cells for independent switching of either beam, making eight possible outputs. With an input of 35 Vrms from a 2 kHz square wave source, each p-polarized beam will be switched with close to 100% efficiency. Optical cross-talk at the outputs is extremely low, exceeding −40 dB with no excitation. Further, if voltage excitation is applied simultaneously to all eight switching electrodes, in the range of 12–16 Vrms, the switch provides simultaneous equi-power in a starlike output at all eight ports. By proper programming of the individual electrodes, any power division between the eight outputs is possible.

The operation of the switch will be understood by tracing the light beam paths, referring to FIGS. 5 and 6, which show an elevation view and a plan view, respectively, of one embodiment of the invention.

An input light beam 71, incident on collimating lens 53 impinges on polarizing beam splitter 54, where the refracted component 72 progagates through prism 56 to liquid crystal layer 58, while the reflected component 73 is redirected by reflector 70 through retarder 55 to a parallel path, also incident on liquid crystal layer 58. When there is no exciting voltage applied to liquid crystal 58 both parallel rays are reflected at respective parallel segmented electrodes 60, as shown by the dashed line emanating from point 61. The crystal refractive index and angle of incidence of the incoming light rays are chosen to provide total internal reflection at point 62 of the upper face of prism 56. Further reflection of both rays occurs at points 63–68, resulting in the light rays exiting through the inclined output face of prism 56. Since the output receptors are located on prism 51, and no light has been directed to these receptors, there is no usable output in this mode. However, by selective excitation of electrodes 60, either one or both of the rays 72, 73 may be redirected to any of the eight fiber optic outputs 69a–69d' For example, when a segmented electrode at point 67 is excited, the corresponding ray 72 or 73 will propagate through liquid crystal layer 58 and prism 57 to be incident upon lens 69a or 69b, respectively, wherefrom it is focused on respective output optical fiber 52a or 52a'. If an electrode at 61 is energized, the direct p-ray component 72 of the incoming light beam will be transmitted through liquid crystal 58 and prism 57 to couple to optical fiber 52d. Since the s-component of the incoming light beam has been transformed to the p-plane by half-wave retardation plate 55, ray 73 will also be transmitted by a parallel activated liquid crystal segment at 61, to emerge at port 52d', adjacent to port 52d. Thus, each of the polarized light beam components may be individually reflected or propagated through liquid crystal 58 by controlling the excitation condition of the segmented electrodes to emerge at one or more ports 52a–52d'. By applying only partial excitation to selected electrodes 60, the incoming light beam may be partially reflected and partially transmitted and thereby apportioned in any desired manner for distribution to the associated output optical fibers. Since the novel invention exhibits reciprocal properties, a multiplicity of input signals of like polarization may be accepted at terminals 52a–52d' for summation within path selector 51, to emerge as a single combined light beam 70 at fiber 50.

Collimating lens 53 acts to collimate a light beam incident from optical fiber 50 upon polarizing beam splitter 54 to maximize optical transmission efficiency. In the reciprocal mode, an entering beam of collimated light from the PBS cube 54 will be focused by lens 53 upon multimode fiber 50. Similarly, lenses 69a–69d' will also provide appropriate collimation or focusing, as determined by the direction of an incident light beam.

While the preceding embodiment permits selection of either or both polarized components of the incoming wave, and further permits splitting the incident optical signal among one or more of output terminals 52a through 52d', with low cross-talk, there is a proportionate loss in available power output at any one terminal due to the division of the available incident light energy. In consequence, even under the most favorable conditions, there will be at least a 3 db theoretical optical insertion loss at any one terminal, with an additional 1–2 db absorption coupling, and reflection losses. While this device affords a compact and flexible means of switching a single input signal among a multiplicity of output terminals, such a 3 db loss is frequently undesirable.

Figure 7:
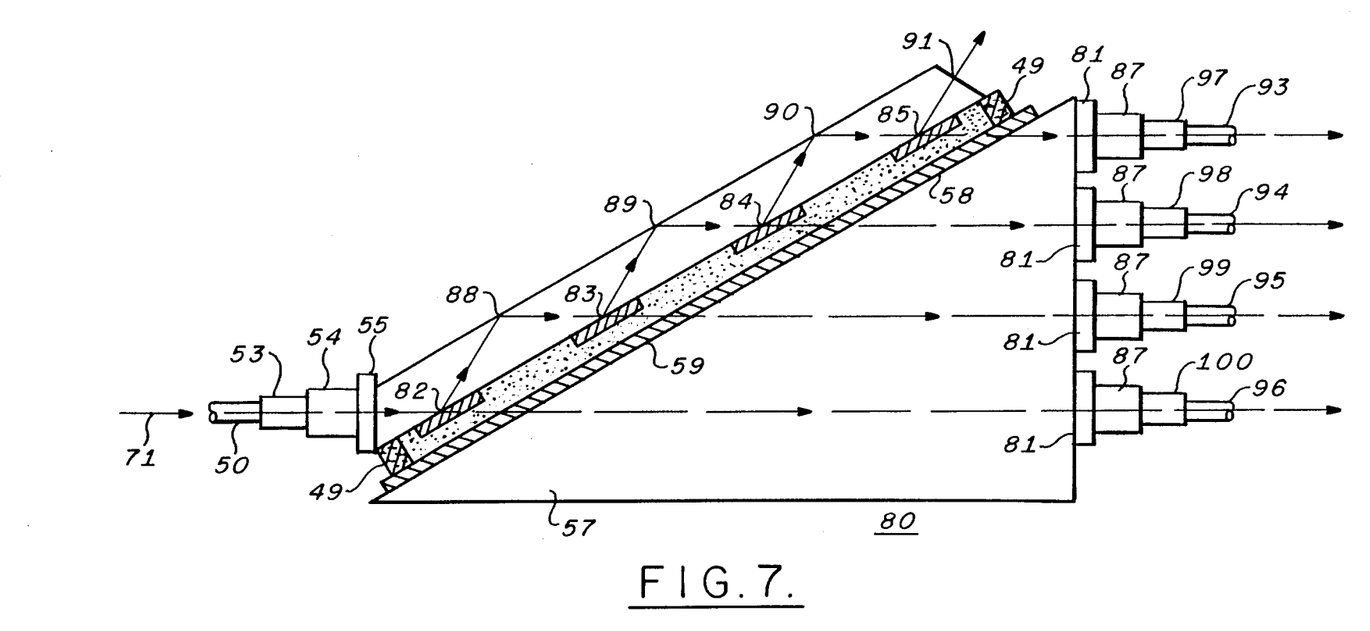
FIG. 7 is an elevation view of a dual-polarization switch of the present invention, with a recombining polarizing structure.
Figure 8:
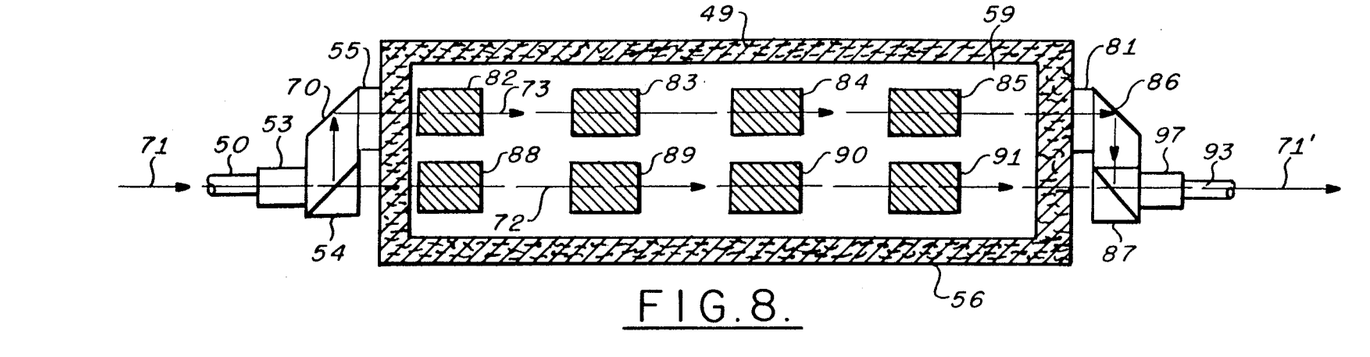
FIG. 8 is a plan view of the device of FIG. 7.

FIGS. 7 and 8 show a second embodiment of the invention wherein the parallel coplanar polarized light beams 72, 73 incident on path selector switch 80 may be recombined at the output to provide a single light beam 71' of arbitrary polarization of substantially the same energy content as was provided to the input. The beneficial effects of this embodiment are obtained by providing a plurality of half-wave retardation plates 81 positioned to receive and convert the p-polarized light beam components transmitted and reflected at electrodes 82–85 to s-plane polarization, a plurality of prismatic reflectors 86 for redirecting the s-polarized components orthogonally to and incident upon a plurality of polarizing beam combiners 87, the beam combiners also positioned to accept the p-polarized light beam component propagated through and reflected at liquid crystal electrodes 88–91, thereby combining the parallel pair of like-polarized light beams 72, 73 when directed by path selection switch 80 into a single polarized light signal 71' of arbitrary polarization at a selected one of terminals 93 through 96. As in the embodiment of FIG. 5, an input light beam will be directed to a desired output port by appropriate excitation of electrodes 82–85 and 88–91. It should be noted, however, that corresponding parallel elements of the segmented planar electrodes must be excited to assure that both polarized light beam components are directed to a common output port. In consequence, this embodiment provides only one-half the number of output ports available for the same size as the device of FIG. 5, but has the advantage of providing substantially reduced transmission losses in that both p and s orthogonal components of the incoming unpolarized light beam are collected at the desired output terminals.

In the structure of FIGS. 7 and 8, all the light is switched and captured, thus the only insertion losses are residual losses, such as spurious reflections, SELFOC coupling loss due to beam spreading, and 0.5 db liquid crystal scattering loss. Beneficially, the total spurious insertion loss should be less than 2 db at any of the four output ports. Thus, this configuration is unique because it combines 1×N routing with very low loss, ultralow cross-talk levels, and moderate voltage excitation requirements. Note that both embodiments of FIGS. 5, 6 and FIGS. 7, 8 are completely bi-directional.

In order that the collimated light beam emitted at the output of a polarizing beam combiner 87 be suitable for efficient energization of multi-mode fiber optic cables 93–96, focusing lenses 97–100 are associated with the polarizing beam combiners. The lenses focus the incident light upon the cores of the output multi-mode optic cables so as to excite the cables for maximum transmission efficiency and provide an output light beam essentially the same as that incident at the input multi-mode fiber. It should be noted that the plurality of half-wave retardation plates, reflecting prismatic bodies, and polarizing beam combiners may also be combined into an extended monolithic device for ease of assembly. The relatively small size of the overall device means that such integrated prisms are easily constructed.

It will also be clear to those skilled in the art that the embodiments described provide a multiplicity of output ports with only a single layer of liquid crystal material. This renders the switch construction and the con-committant control circuitry considerably simpler than other prior art switches requiring a multilayer structure.

Figure 9:
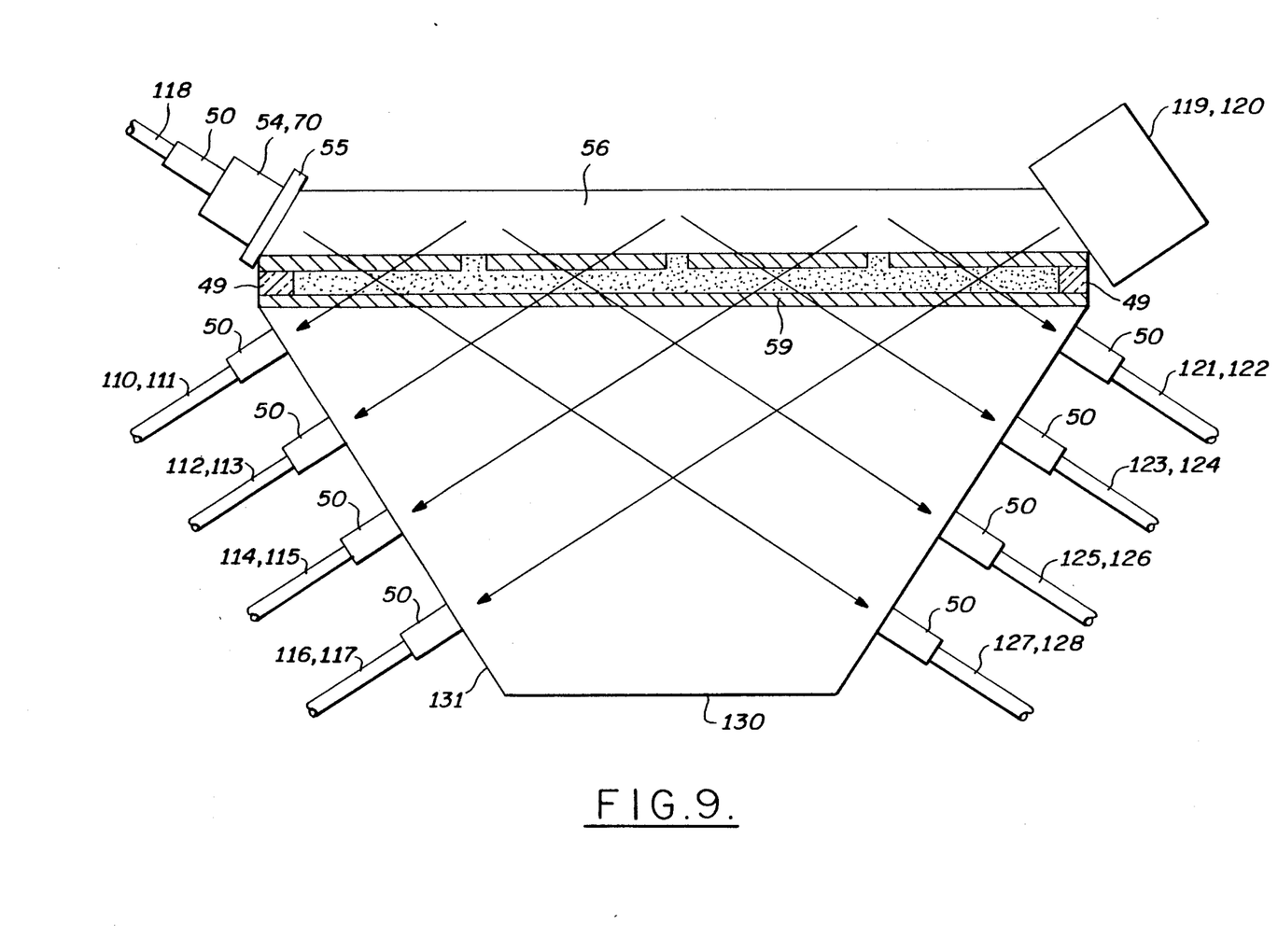
FIG. 9 is an elevation view of a switch of the present invention using an optical folding technique to increase the number of switch positions.
Figure 10:
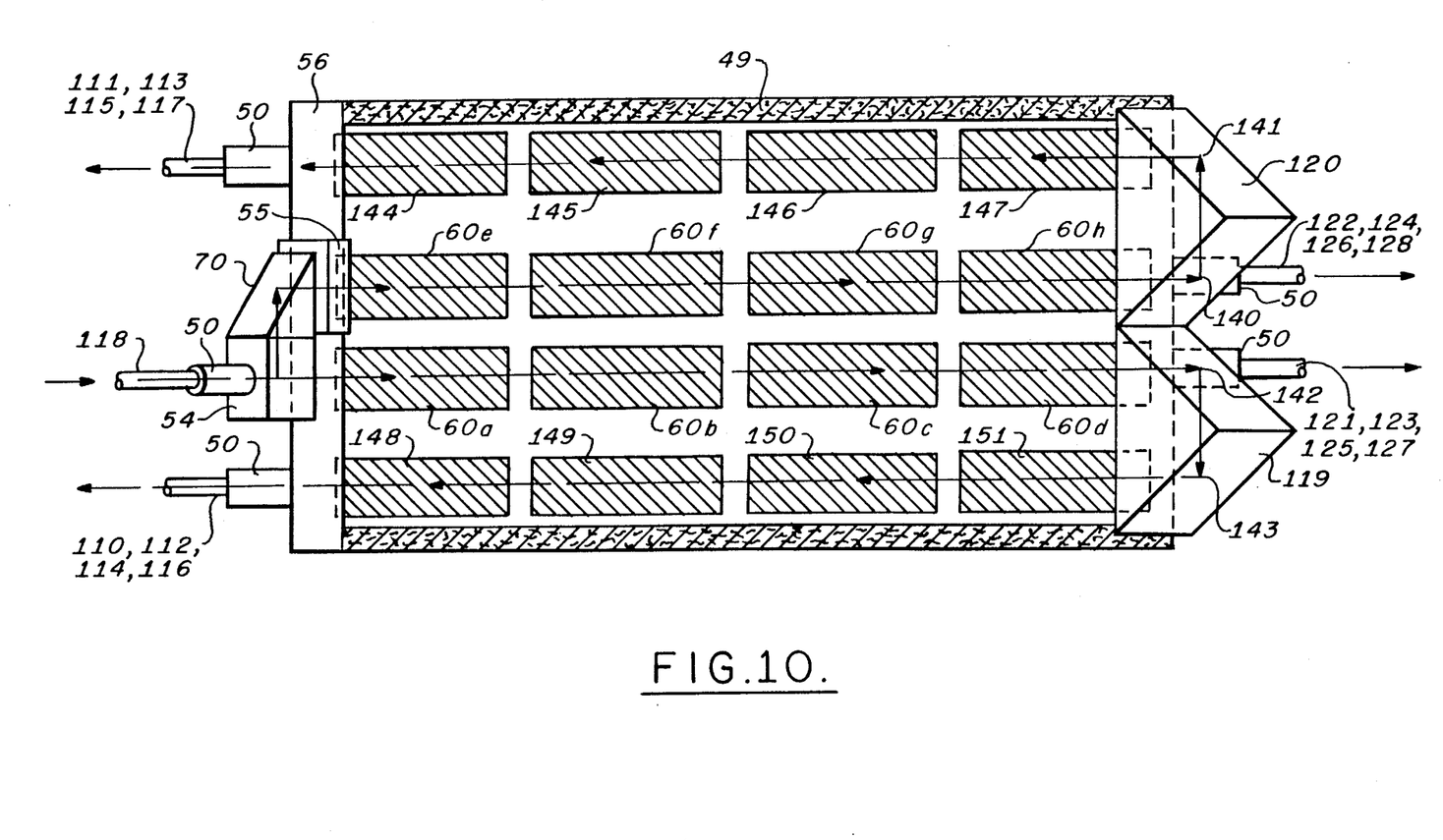
FIG. 10 is a plan view of the invention of FIG. 9.

A further increase in the number of switch positions without greatly increasing the physical size and structural complexity of the switch can be provided as exemplified by the 1×16 switch shown in FIGS. 9 and 10. It may be seen that the structure is similar to those of the previous embodiments with the addition of output terminals 110–117 adjacent to input multi-mode fiber 118, and prismatic bodies 119, 120 adjacent to output terminals 121–128. The 1×16 switch is approximately the same cross-sectional dimensions as the 1×8 switch of FIG. 6 but with wider flint glass prisms. As shown in FIG. 10, 16 independent electrode segments 144–151 and 60a–60h are provided. Further, as seen from FIG. 9, the lower flint-glass prism 130 is extended at oblique surface 131 to accomodate eight back-traveling switched beams at normal incidence. As in the former embodiments, only two pieces of flint glass prism are required, and performance specifications are comparable to FIG. 5.

Prisms 119, 120 are oriented to provide 180 degree redirection of a pair of incident p-polarized light beams. Incident light beams will be reflected at points 140, 141, 142 and 143 and returned in the direction opposing that of the incident rays and in a path parallel thereto. Thus, polarized light beam components incident on electrodes 60 may be caused to traverse a second plurality of electrodes 144–147 and 148–151, thereby doubling the number of available and controllable output ports, with a proportionate increase in the width of the path selector body. Note that, as in the embodiment of FIG. 5, no provision is made for combining the parallel polarized beam components, therefore this device will also suffer at least a 3dB loss in transmission efficiency due to the requisite polarization of the incoming light beam.

Figure 11:
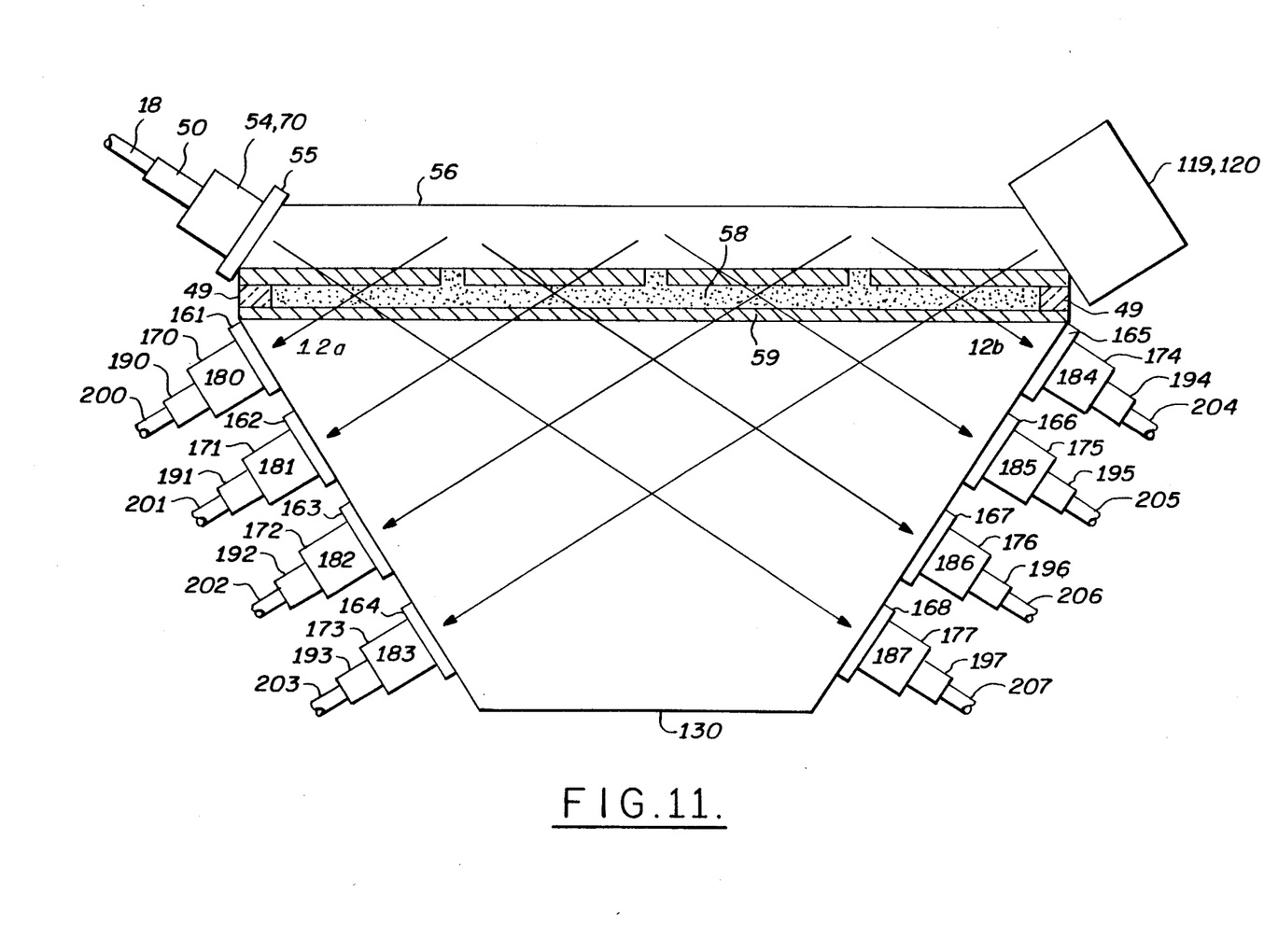
FIG. 11 is an elevation view of a dual-polarization switch with beam combiner assemblies and folded path structure.

By providing a plurality of halfwave retardation plates 161–168, prismatic reflectors 170–177 and polarizing beam combiners 180–187 as shown in FIG. 11 and FIG. 12 and the expanded segemented electrode structure shown in FIG. 10, the parallel and coplanar pairs of polarized optical beams may be recombined to form a single loss-free polarized output beam of arbitrary polarization. Each output port is preferably equipped with a focusing lens 190–197 for providing an efficient transition to the respctive multi-mode fiber optic output cables 200–207. Thus the structure of FIG. 11 may be used to create a 1×8 switch with low loss. A similar structure could be used with the polarizing beam combiners of FIGS. 7 and 8 to provide a 1×8 switch without polarization efficiency loss.

Figure 12A:
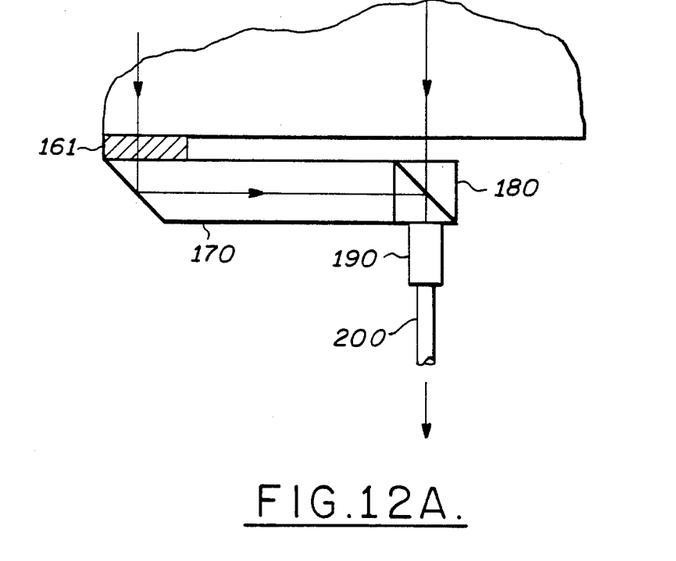
FIG. 12 is a fragmentary sectional plan view of the invention of FIG. 11 along lines 12a and 12b, showing the reflector/retardation plate structures.
Figure 12B:
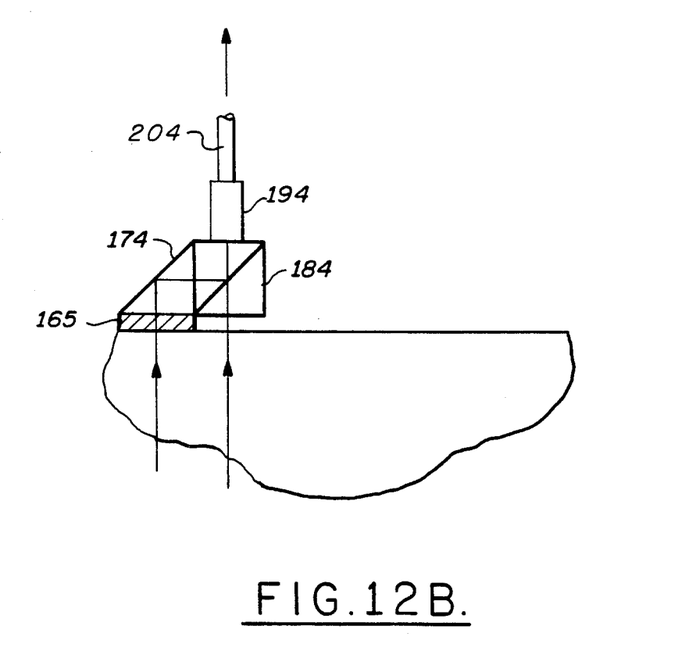

FIG. 12A shows a sectional view through a polarizing beam splitter assembly of FIG. 11 as used in the output ports adjacent to the input fiber optic cables 200–203. FIG. 12b shows a similar view through the polarizing beam splitter, assembly adjacent to the 180° prisms 199, 120. Note that typical reflecting prism 170 has an extended body to accommodate increased dimensions of the added rows of segmented electrodes, as shown most clearly in the electrode disposition of FIG. 10.

Figure 13:
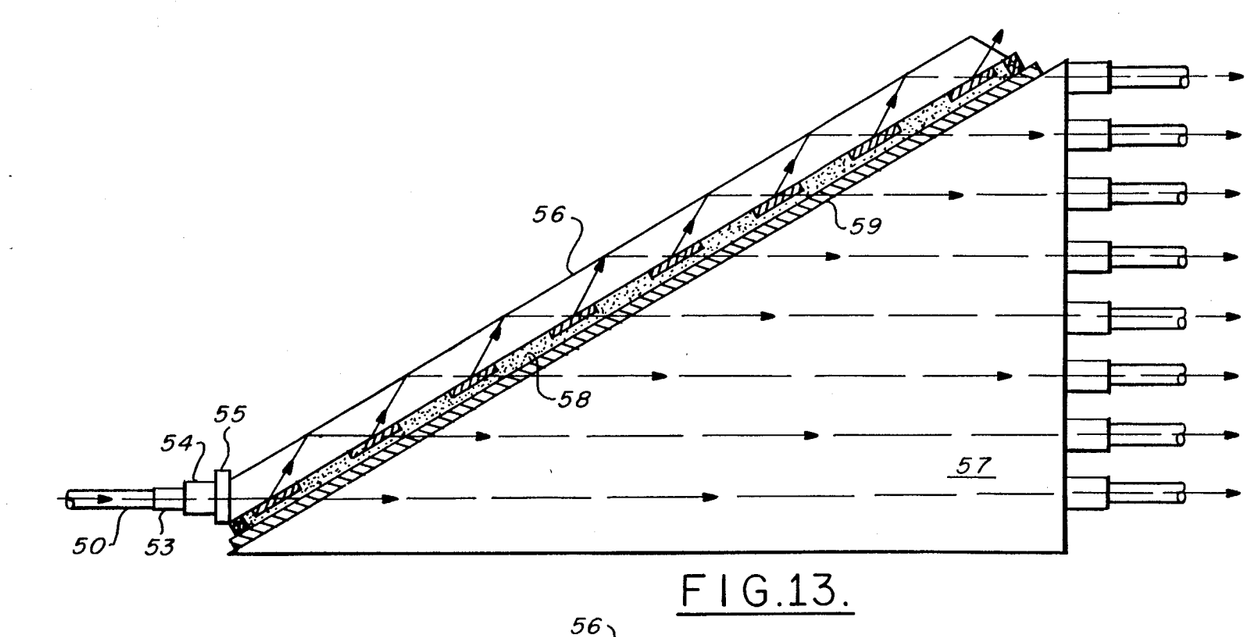
FIG. 13 is an elevation view of another embodiment for extending the number of output terminals without folding the structure.
Figure 14:
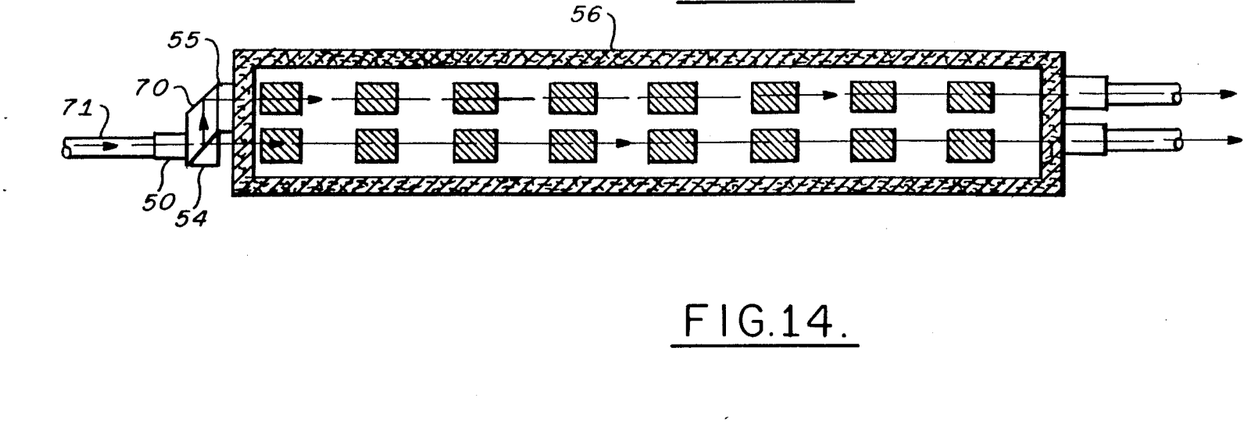
FIG. 14 is a plan view of the embodiment of FIG. 13, showing the disposition of the segmented electrodes.

The number of switching ports could also be extended in a manner similar to that shown in FIG. 13 and FIG. 14, with a simple in-line (unfolded) structure using two flint-glass prisms, relatively long and narrow. While providing similar performance, this structure is regarded as somewhat more difficult to build than the embodiment of FIGS. 9 and 10.

The beneficial performance of the present invention in reduction of cross-talk (i.e., the presence of an undesired signal component at an output port intended to be switched off) as compared to prior art devices is attributed in large measure to the novel combination of the nematic liquid crystal reflector-transmitter and prismatic polarization beam splitter combiner. Prior art devices employing the liquid crystal as a ploarizer and polarization combiner made use of the light beam reflected by the liquid crystal as well as the beam transmitted through the liquid crystal. Since there is a relatively substantial unpolarized s-component reflected along with the p-component in the polarized beam, the optical signal-to-cross-talk ratio was limited to about 16:1 (−12 db). In the present invention, since polarization and recombination are performed in the polarizing beam splitter, the liquid crystal provides essentially perfect reflection in the quiescent reflection mode, and provides a ratio of p-component to s-component of approximately 5000 in the activated transmission mode, a ratio of about 37 db. Wile the cross-talk of the polarizing beam splitter is the order of 20 db, the over-all switch cross-talk will be determined by the liquid crystal section, and may approach 40 db under optimum conditions.

While the invention has been described in its preferred embodiments it is to be understood that the words which have been used are words of description rather than of limitation and that changes within the purview of the appended claims may be made without departing from the true scope and spirit of the invention in its broader aspects.

We claim:

1. An optical switch comprising:
   (a) polarizing beam splitter means having first and second faces, for separating an incident light beam of arbitrary polarization into first and second light beams with first and second orthogonal linearly polarized states respectively, said first light beam refracted to propagate along a first path, and said second light beam refracted to propagate along a second path,
   (b) first reflector means positioned to deflect said second light beam along a path parallel to said first path,
   (c) first polarization converter means positioned in said second path for rotating said light beam polarization from said second linearly polarized state to substantially said first linearly polarized state, and
   (d) first and second electrically responsive path selector means positioned in said parallel paths of said first and second light beams for selecting one of a first plurality of optical paths for said first light beam and one of a second plurality of optical paths for said second light beam.

2. The optical switch of claim 1, wherein:
   (a) said first reflector means comprises a prism having first and second planar surfaces and a third surface in oblique juxtaposition with said first and second surfaces, and
   (b) said first surface is disposed in parallel superposition with said second face of said polarizing beam splitter means, such that said second light beam when incident on said first surface at an angle of incidence exceeding a critical angle of incidence is substantially totally reflected within said prism to emerge at said second surface.

3. An optical switch as set forth in claim 1 wherein said first polarization converter means comprises a one-half wave retardation plate.

4. An optical switch as set forth in claim 1 wherein said first polarization converter means is disposed between said first reflector means and said path selector means, positioned in said path of said deflected second light beam to propagate said light beam in said first linearly polarized state to said path selector means.

5. An optical switch as set forth in claim 1 wherein said first polarization converter means is disposed between said second face of said polarizing beam splitter and said first reflector means, positioned in said path of said second light beam to propagate said second light beam in said first linearly polarized state to said first reflector means.

6. The optical switch as set forth in claim 1, further comprising:
   (a) first lens means positioned to receive said incident light beam of arbitrary polarization for colimating said light beam and providing an arbitrarily polarized collimated beam to said polarizing beam splitter, and
   (b) at least one of a plurality of second lens means positioned to receive at least one emergent polarized optical beam for focusing said beam upon a respective one of a plurality of output terminals.

7. The optical switch of claim 6, wherein said incident light beam is carried on an optical fiber, and said one of said output terminals is connected to an optical fiber.

8. An improved optical switch of the type including polarizing beam splitter means having first and second faces, for separating an incident light beam of arbitrary polarization into first and second light beams with first and second orthogonal linearly polarized states respectively, said first light beam refracted to propagate along a second path, first reflector means positioned to deflect said second light beam along a path parallel to said first path, and first polarization converter means positioned in said second path for rotating said light beam polarization from said second linearly polarized state to substantially said first linearly polarized state, wherein the improvement comprises:
   (a) first and second electrically responsive path selector means positioned in said parallel paths of said first and second light beams for selecting one of a first plurality of optical paths for said first light beam and one of a second plurality of optical paths for said second light beam,
   (b) a confined layer of electro-optically active liquid crystal means having first and second molecular states, positioned to intercept said first and second light beams in said first polarization state for reflecting said first and second light beams when in said first molecular state, and for permitting light to propagate therethrough when in said second molecular state,
   (c) first and second spaced apart transparent bodies having respective superposed planar surfaces at said liquid crystal layer, said first transparent body being characterized by first and second surfaces parallel to said layer, and by first and second end faces at least one of which is disposed at a predetermined oblique angle with respect to said first or second parallel surfaces, and
   (d) means for selectively aplying an electric field to said liquid crystal means, comprising a plurality of first transparent electrode means affixed to said superposed planar surface of said first transparent body and second superposed transparent electrode means affixed to said superposed planar surface of said second transparent body.

9. An optical switch as in claim 8, wherein said liquid crystal means further includes a material having positive dielectric anisotropic properties whose molecules are ordered in said first molecular state with their long axes parallel to said layer and parallel to a plane of optical incidence defined by the light beam incident to said liquid crystal layer and the normal to said layer, and whose molecules are ordered with their long axes perpendicular to said layer and parallel to said plane of optical incidence in said second molecular state.

10. An optical switch as in claim 8, wherein said second transparent body is further characterized by first and second orthogonal surfaces in oblique juxtaposition with said superposed planar surface of said second transparent body.

11. An optical switch as in claim 8 wherein said second transparent body is further characterized by first and second parallel planar surfaces, said first surface disposed adjacent to said liquid crystal layer, and first and second end faces disposed at at least one predetermined angle with respect to said first or second parallel surfaces.

12. In an optical switch of the type including polarizing beam splitter means having first and second faces, for separating an incident light beam of arbitrary polarization into first and second light beams with first and second orthogonal linearly polarized states respectively, said first light beam refracted to propagate along a first path, and said second light beam refracted to propagate along a second path, first reflector means positioned to deflect said second light beam along a path parallel to said first path, first polarization converter means positioned in said second path for rotating said light beam polarization from said second linearly polarized state to substantialy said first linearly polarized state, the improvement comprising:
   (a) first and second electrically responsive path selector means positioned in said parallel paths of said first and second light beams for selecting one of a second plurality of optical paths for said second light beam, said optical paths selected to define a pair of like-polarized parallel first and second light beams,
   (b) second polarization converter means, positioned for rotating the polarization of said second light beam from said first linearly polarized state to substantially said second linearly polarized state, and
   (c) second reflector means positioned to deflect said second light beam to a path also incident upon first polarizing beam combiner means,
   (d) said first polarizing beam combiner means positioned in said parallel optical paths for combining said first and second light beams to form at least one arbitrarily polarized light beam.

13. The optical switch of claim 12, wherein:
   (a) said second reflector means comprises at least one of a plurality of prisms having respective first and second planar surfaces and a third planar surface in oblique juxtaposition with said first and second surfaces,
   (b) said second polarization converter means comprises at least one of a plurality of polarization converter means further comprising one-half wave retardation plates, (c) said first polarizing beam combiner means comprises at least one of a plurality of polarizing beam combiner means, and (d) said first surface of said one of said second reflector means is respectively disposed in parallel superposition with said one of said second polarization converter means, positioned in said selected optical path of said second light beam in said second linearly polarized state and said second surface is of one of said second reflector means disposed in parallel superposition with a respective first face of said one of said plurality of polarizing beam combiner means, so that said second light beam when incident to said first surface of said first reflector means at an angle of incidence exceeding a first critical angle of incidence is substantially totally reflected within said reflector to emerge at said second surface of said first reflector means, and said second light beam when incident to said first surface associated with said second reflector means at an angle of incidence exceeding a second critical angle of evidence is substantially totally reflected therein to emerge at said second surface of said second reflector means.

14. An optical switch as set forth in claim 12 wherein said second polarization converter means is disposed between one of said first or second path selector means and said second reflector means, positioned in said path of said second light beam emerging in said first linearly polarized state to propagate said beam to said second reflector means.

15. An optical switch as set forth in claim 12 wherein said second polarization converter means is disposed between said second reflector means and said first polarizing beam combiner means, positioned in said path of said second light beam emerging in said first linearly polarized state to propagate said beam to said first polarizing beam combiner means.

16. An optical switch, as set forth in claim 12, further comprising:

(a) third and fourth reflector means, positioned to redirect said parallel light beams from said first and second path selector means to (b) third and fourth path selector means, said redirected beams being parallel to and in opposing direction of propagation of said first and second light beams from said first and second path selector means, (c) said first, second, third and fourth path selector means adapted to select at least one of a plurality of paths wherein at least one pair of said first and second light beams or said first and second redirected light beams emerge as like-polarized parallel first and second light beams or like-polarized parallel first and second redirected light beams, respectively, and further comprising, (d) third polarization converter means positioned in the path of said redirected light beams from said third or fourth path selector means for rotating one of said beams from said first linearly polarized state to said second linearly polarized state, (e) fifth reflector means positioned in said path of said redirected light beams from said third or fourth path selector means to redirect said one of said beams upon said second polarizing beam combiner means, and (f) said second polarizing beam combiner means is positioned to combine said beam from said third polarization converter means with one of said redirected beams other than said beam in said second linearly polarized state to form at least one arbitrarily polarized light beam.

17. An optical switch as set forth in claim 16, wherein said third polarization converter means is disposed between said third or fourth path selector means and said fourth reflector means, positioned in said path of said redirected second light beam in said first linearly polarized state to propagate said light beam to said fourth reflector means.

18. An optical switch as set forth in claim 16, wherein said third polarization converter means is disposed between said fourth reflector means and said second polarizing beam combiner means, positioned in said path of said emergent second light beam in said first linearly polarized state to propagate said second light beam to said second polarizing beam combiner means.

19. An improved optical switch of the type including polarizing beam splitter means having first and second faces, for separating an incident light beam of arbitrary polarization into first and second light beams with first and second orthogonal linearly polarized states respectively, said first light beam refracted to propagate along a first path, and said second light beam refracted to propagate along a second path, first reflector means positioned to deflect said second light beam along a path parallel to said first path, and first polarization converter means positioned in said second path for rotating said light beam polarization from said second linearly polarized state to substantially said first linearly polarized state, wherein the improvements comprises:

(a) first and second electrically responsive path selector means positioned in said parallel paths of said first and second light beams for selecting one of a first plurality of optical paths for said first light beam and one of a second plurality of optical paths for said second light beam, (b) third or fourth reflector means, positioned to redirect said one of said first and second light beams for said first or second path selector means to third or fourth path selector means, said redirected beams being parallel to and in opposing direction of propagation to said first and second light beams from said first and second path selector means, and (c) said first, second, third and fourth path selector means adapted to select at least one of said first or second plurality of optical paths for said first and second light beams and at least one of a third and fourth plurality of optical paths for said first and second redirected light beams, respectively, to emerge as at least one polarized light beam.

20. The optical switch of claim 19 wherein:

(a) said third reflector means comprises at least one of a plurality of prisms having respective first and second planar surfaces and a third planar surface in oblique juxtaposition with said first and second surfaces, and (b) said first surface of said third reflector means is disposed in parallel superposition with said second end face of said first transparent body.

* * * * *